United States Patent [19]

Nagata

[11] Patent Number: 4,548,304

[45] Date of Patent: Oct. 22, 1985

[54] ONE-WAY CLUTCH AND WINDING AND REWINDING DEVICE FOR CAMERA USING THE SAME

[75] Inventor: Toru Nagata, Kanagawa, Japan

[73] Assignee: Canon Kabushiki Kaisha, Tokyo, Japan

[21] Appl. No.: 442,022

[22] Filed: Nov. 16, 1982

[30] Foreign Application Priority Data

Nov. 17, 1981 [JP] Japan ................ 56-184632
Nov. 17, 1981 [JP] Japan ................ 56-184633

[51] Int. Cl.[4] ............... G03B 1/12; F16D 11/00; F16D 41/12
[52] U.S. Cl. .................................. 192/46; 192/54; 192/71; 192/93 R; 242/71.6
[58] Field of Search .............. 192/39, 46, 48.92, 54, 192/71, 74, 75, 93 R, 48.9; 188/82.7, 82.77; 242/71.6; 354/173.1

[56] References Cited

U.S. PATENT DOCUMENTS

| 233,636 | 10/1880 | Passmore | 192/46 |
|---|---|---|---|
| 688,644 | 12/1901 | Houghtaling | 192/46 |
| 1,908,905 | 5/1933 | Landahl | 188/82.77 |
| 2,341,753 | 2/1944 | Zwald | 188/82.77 |
| 3,783,762 | 1/1974 | Sugimori | 242/71.6 X |

FOREIGN PATENT DOCUMENTS

43-4138  2/1968  Japan .

*Primary Examiner*—Rodney H. Bonck
*Attorney, Agent, or Firm*—Toren, McGeady, Stanger, Goldberg & Kiel

[57] ABSTRACT

A one-way clutch having a pawl member whose attitude is controlled in accordance with the direction of rotation of the input side of the clutch and which turns as the input side rotates in a given direction thus operating to change over between transmission and non-transmission of a driving force by controlling engagement and disengagement in accordance with the direction of rotation and the attitude of the pawl member. In application of this one-way clutch to winding and rewinding devices for cameras when one of a pair of one-way clutches is in the transmitting state by rotation of the motor in a given direction, the other one-way clutch is prevented from becoming engaged as a result of motion of the film.

4 Claims, 4 Drawing Figures

ONE-WAY CLUTCH AND WINDING AND REWINDING DEVICE FOR CAMERA USING THE SAME

BACKGROUND OF THE INVENTION

1. Field of the Invention

This invention relates to a one-way clutch and to winding and rewinding devices for cameras using the same.

2. Description of the Prior Art

The one-way clutches which have been widely used in the past are known as providing transmission of rotation in a given direction of an input shaft to an output shaft. In the operation of such clutches, when relative motion of the input shaft and the output shaft is in a certain given direction, the input shaft and the output shaft are interlocked to enable transmission of rotation therebetween. Therefore, the relationship between the output shaft and the input shaft is such that there exists a dependence on each other whereby a problem may arise in that the output shaft cannot be left completely free from the input shaft. That is, in the conventional one-way clutch, when applied to a system where some rotative force is imparted to the output shaft other than through the input shaft, there arises the possibility that rotation will be reversely transmitted from the output shaft side to the input shaft side. If such system is, for example, employed to wind and rewind film in a camera, the reliability of its operation will be seriously damaged.

In the prior art, it is known to provide an apparatus using a pair of such one-way clutches arranged between the motor and a winding system and between the motor and a rewinding system so as to produce opposite directions of transmission so that the driving torque of the motor is selectively transmitted to the winding and rewinding systems depending upon the direction of rotation of the motor as disclosed in Japanese Patent No. Sho 43-4138 (published Feb. 15, 1968). However, in the winding and rewinding device of the camera, as described above, when film winding or rewinding is being performed, the driving connection of the motor to the takeup side results in that the supply side is also rotated by the motion of the film although the driving torque of the motor is not transmitted thereto. Thus, the diameter of the convoluted film on the takeup side increases, while the diameter of convoluted film on the supply side decreases so that the rotation of the supply side speeds up as the winding of the film goes on. For this reason, in the case of the apparatus of the above-cited Japanese Patent No. Sho 43-4138 constructed by using the one-way clutch which assumes the non-transmitting position due to the relative rotation direction of the input side to the output side, it follows that, for example when rewinding, because the output side of the one-way clutch arranged in the winding up system is rotated by the moving film in a direction to connect the clutch, and for the rewinding goes so far ahead that the speed of rotation of the output side is faster than that of rotation of the input side which is rotating in a direction to cut off the clutch by the reversed rotation of the motor, the following problem will arise. That is, since, at this time, the one-way clutch which is caused to connect becomes transmitting, the driving torque of the motor is transmitted also to the winding system directly from the motor, whereby the rotation of the winding system is interfered with to render further rewinding impossible.

That is, such a one-way clutch produces a disadvantage in that though, as has been mentioned above, its input side rotates in the direction to render the clutch non-transmitting it is when the output side is rotated in the same direction at a faster speed than that speed by some external force that the connection takes place and that the transmitting state operates. Therefore, the winding and rewinding device for a camera using this one-way clutch can not avoid the above-described drawback. On this account, in the art of winding and rewinding devices for cameras using the conventional type of one-way clutch, to provide assurance that the winding and rewinding proceeds without interference, it is required to employ a changeover means for connecting and disconnecting the driving torque transmitting gear. This requires an objectionably large increase in the complexity of the structure and the bulk and size. Also, there is an additional drawback in that it is difficult to build it into a small-sized camera.

SUMMARY OF THE INVENTION

With the foregoing in mind, it is an object of the present invention to provide a one-way clutch which changes over between transmitting and non-transmitting states depending not on the relative direction of rotation of the input side to the output side, but on the absolute direction of rotation of the input side.

Another object of the present invention is to provide a winding and rewinding device for a camera employing a pair of one-way clutches that changes over between the transmitting and non-transmitting states depending upon the absolute direction of rotation of the input side, arranged between a motor and a winding system and between the motor and a rewinding system so that each clutch will transmit torque only during opposite directions of motor rotation, whereby when one clutch is in the transmitting state there is no possibility for the other clutch to be brought into the transmitting state thereby to render film transporting no longer possible.

These and other objects of the present invention will become apparent from the following detailed description of a preferred embodiment thereof taken in connection with the accompanying drawings.

DETAILED DESCRIPTION OF THE PREFERRED EMBODIMENTS

The present invention will next be described in greater detail in connection with embodiments thereof by reference to the drawings.

Figure 1:
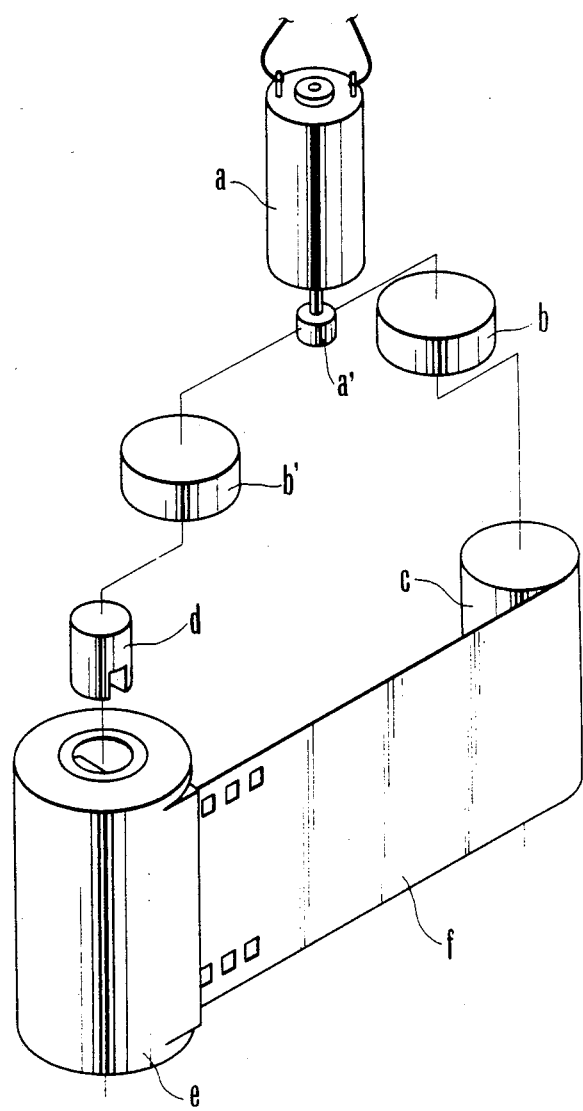
FIG. 1 is a schematic perspective view of an embodiment of a winding and rewinding device for a camera according to the present invention.

In FIG. 1 there is shown a winding and rewinding device for a camera using a pair of one-way clutches, b and b', of the invention. The one-way clutch b is arranged in a winding system and oriented so that when a drive source or electric motor, a, rotates in a normal or first direction an input gear to be described later is rotated in a counterclockwise direction through a pinion gear a' and motion of motor a is transmitted therethrough to a spool c, whereby a film f is wound on the spool c. The other one-way clutch b' is arranged in a rewinding system and is oriented so that when the motor a rotates in the reversed direction the input gear of the clutch b' is rotated in a clockwise direction through the pinion gear a' and the motion of the motor a is transmitted to a rewind fork d, whereby the film f is rewound into a cartridge e. It is to be noted in connection with this camera that the transportation mechanism for the film f is of the spool drive type, and the one-frame advancement control mechanism may be of any type known to those skilled in the art, and therefore that these mechanisms are not shown in FIG. 1.

Figure 2:
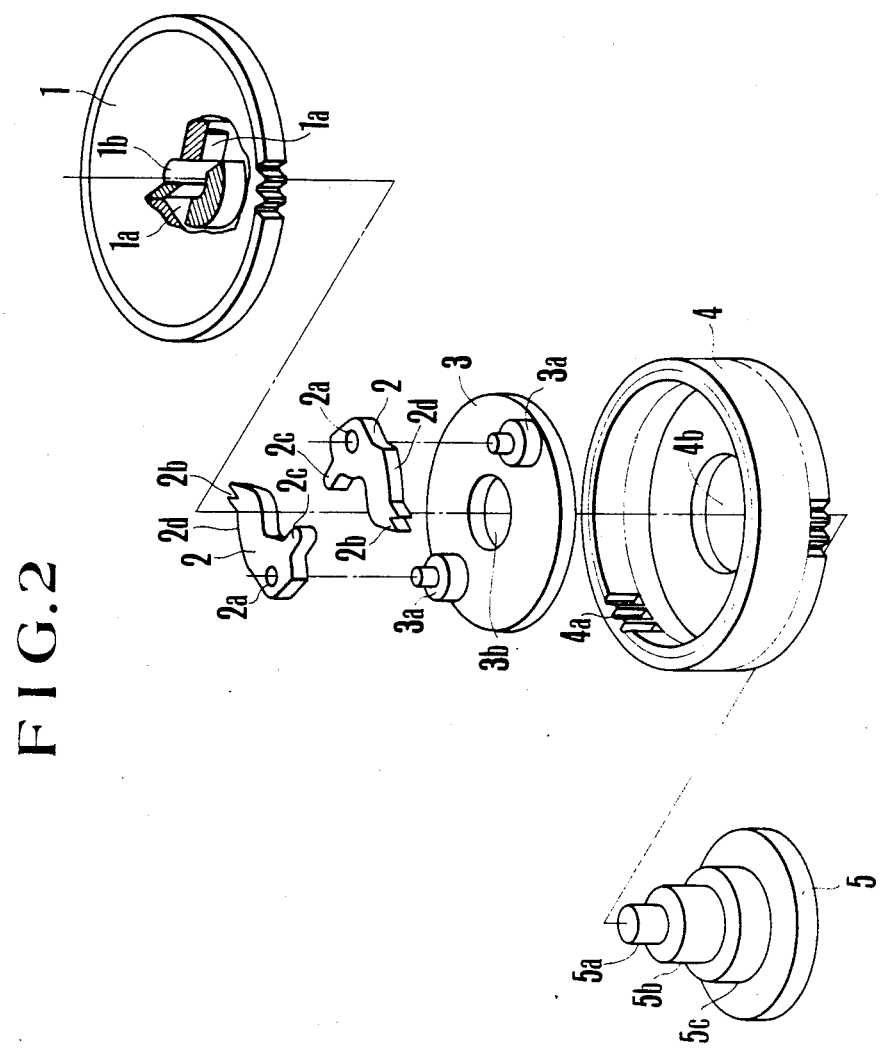
FIG. 2 is an exploded perspective view of an embodiment of a one-way clutch according to the present invention.

Next, FIG. 2 is an exploded perspective view illustrating the details of the structure of the one-way clutch b'. Since the structure of the other one-way clutch b is similar to that of this illustrated embodiment except that a pawl member 2 is supported in a reversed direction, and a gear-toothed portion 4a is formed to an inverted shape, and also since its function differs only in the direction of transmission of the driving force but is similar in the other aspects, an explanation of the one-way clutch b is omitted.

In this drawing, 1 is an input gear meshing with the pinion gear a' of motor a through a gear train (not shown) and having a cutout portion 1a in the lower surface as viewed in the drawing near the center of rotation thereof to transmit driving force. A pair of pawl members 2 are provided for transmitting rotation of input gear 1 to an output side depending upon the attitude of the pawls. The pawl members 2 are each pivotally supported through a hole 2a about a shaft 3a of a pawl support disc 3 at a different position from the center of rotation of the pawl support disc 3. It is to be noted that though the number of pawl members 2 is two in this embodiment, only one or more than two may be provided. 4 is an output gear formed to a cylindrical shape, and having a toothed portion in the outer periphery thereof to rotate the fork d, and another toothed portion in the inner periphery thereof to be engageable with claws 2b of pawl members 2 (though partly shown in the drawing). Also the claws 2b of pawl members 2 and the toothed portion 4a are formed in a similar relation to the respective parts of a ratchet mechanism. A projected portion 2c of pawl member 2 extends into cutout portion 1a of input gear 1 so as to control connection and disconnection of the claws 2b of pawl members 2 with and from the toothed portion 4a as pawl members 2 are turned about shaft 3a in a direction depending upon the direction of rotation of input gear 1. 5 is a support shaft individually rotatably supporting input gear 1, pawl support disc 3 and output gear 4 in such manner that a hole 1b of input gear 1 is fitted on a peripheral surface 5a, a hole 3b of pawl support disc 3 on a peripheral surface 5b, and a hole 4b of output gear 4 on a peripheral surface 5c.

Figure 3A:
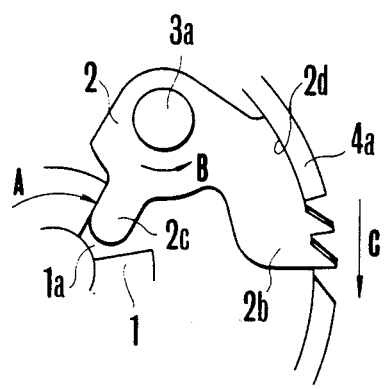
FIGS. 3(a) and 3(b) are fragmentary plan views of the one-way clutch of FIG. 2.
Figure 3B:
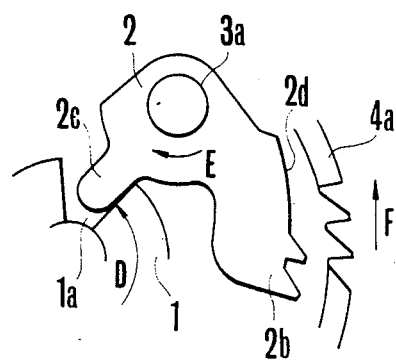

The operation of the clutch of FIG. 2 is described below by reference to FIGS. 3(a) and 3(b). It is to be noted here that since this embodiment represents the one-way clutch b' as has been mentioned above, clockwise rotation of input gear 1 results in engagement of the clutch, and counterclockwise rotation results in disengagement thereof. It is to be also noted that FIG. 3(a) illustrates the engaged state of clutch b', and FIG. 3(b) illustrates the disengaged state of clutch b'.

With the device of FIG. 1 switched to the rewinding mode, as the direction of rotation of motor a is reversed, input gear 1 of one-way clutch b' starts to rotate in a clockwise direction. By this rotation, the projected portion 2c of pawl member 2 is pushed in engagement with one side of cutout portion 1a, so that pawl member 2 turns in a counterclockwise direction about the shaft 3a until the claws 2b engage the toothed portion 4a of output gear 4. Also at this time a side surface 2d abuts against the input peripheral surface of output gear 4 so that the pawl member 2 is hindered from further turning about shaft 3a in the counterclockwise direction. Therefore, clockwise rotation of input gear 1 can not be transmitted through pawl members 2 to output gear 4. Then, input gear 1, pawl members 2, pawl support disc 3 and output gear 4 rotate in unison in a clockwise direction (arrow C).

Since, at this time, therefore, rewind fork d of FIG. 1 also rotates in the clockwise direction, rewinding of film f into cartridge e is carried out. On the other hand, reversed motion of motor a is also routed to turn the input gear of the other one-way clutch b. As has been mentioned above, however, the pawl members of one-way clutch b are oriented oppositely resulting from turning of the pawl members 2 of FIG. 3(a) upside down with respect to the drawing so that clockwise rotation of the input gear releases the pawls from connection with the toothed portion of the output gear. No matter how the output gear may rotate, therefore, its rotation never results in transmission to the input gear. Thus, even though the takeup spool c is rotated in the reversed direction by the moving film f, the rewinding of the film cannot be obstructed.

Also, with the camera switched to the winding mode, when each exposure operation is completed, motor a is supplied with current and pinion gear a' rotates in the counterclockwise (normal) direction until film f is wound up on spool c to the length of one frame. During this time, the input gears of the one-way clutches b and b' rotate in the counterclockwise direction.

At this time, the pawl members 2 of one-way clutch b' are turned about the shafts 3a in the clockwise direction (arrow E) by cutout portion 1a of input gear 1 engaging tails 2c as illustrated in FIG. 3(b). Therefore, while the claws 2b are held out of engagement with toothed portion 4a of output gear 4, input gear 1, pawl members 2 and pawl support plate 3 rotate in the counterclockwise direction as a unit. Therefore, even though rewind fork d is rotated in the counterclockwise direction by the film moving in the winding direction, and, therefore, output gear 4 is rotated in the counterclockwise direction (arrow F), it never occurs that one-way clutch b' takes the transmitting position. That is, in this position, the output gear 4 of one-way clutch b' becomes completely free.

Also, at this time, the pawl members of the other one-way clutch b come into engagement with the output gear, and this one-way clutch is held in the transmitting position. This is similar to the connecting position of the aforesaid one-way clutch b', and its explanation is omitted.

It will be appreciated that the device of FIG. 1 having the one-way clutches b and b' assures that only one of the spool c and rewind fork d can be driven to move at a time by rotation of motor a, while the other clutch disengages the drive connection between the spool c or rewind fork d and motor a whereby winding and rewinding operation of the film f may be performed with high reliability.

As has been described in greater detail above, the present invention provides a winding and rewinding device by arranging in each of the winding system and the rewinding system a one-way clutch capable of holding the non-transmitting position by the absolute direction of rotation of the input side with the advantage that for example when rewinding, there is no possibility of the occurrence of transmitting rotation of the winding system to the drive source or the like, and, therefore, of accidentally interrupting the rewinding operation. According to the present invention, therefore, reliable performance of the winding and rewinding operation can always be expected.

Also, according to the present invention, there is no need to change the meshing engagement of the transmission gear when the camera is changed over between the winding and rewinding modes, thereby giving an additional advantage that the structure of the device itself can be simplified and the reliability of camera operation can be improved.

Further, one of the features of the one-way clutch of the invention is that after the pawl member 2 and the toothed portion 4a of the output gear 4 have been set in engagement by rotation of the input gear 1, even when rotation of input gear 1 stops, the claws 2b are maintained in engagement with the toothed portion 4a. Therefore, when input gear 1 rotates in the clockwise direction, rotation of output gear 4 can be started without a time lag.

It is to be noted that in this embodiment, the pawl member 2 and output gear 4 are made to be connected in unison by engaging the claws 2b with the toothed portion 4a. This may be modified such that instead of the claws 2b and the toothed portion 4a, frictional members may be provided in the pawl member 2 and output gear 4 so that the connection is established by the frictional force.

In this embodiment, the transmission direction of the one-way clutches b, b' is so arranged as to selectively transmit the rotation of the motor to the winding system and the rewinding system by reversing the attitude of the pawl member 2. However, the one-way clutches b, b' may be identical to each other, and the input shafts of the clutches may be made to rotate in an opposite direction to each other by differentiating the number of the gears for transmitting the driving force to each clutch from the motor for the winding and rewinding systems (for example one more gear is provided between the clutch for rewinding and the motor than the gear number provided between the clutch for winding and the motor).

Further, in the above embodiment, the force given to the pawl member 2 from the input gear 1 at the time of switching of the clutch rotates only the pawl member 2 and does not rotate the intermediate member 3 mainly due to the difference in the inertia moment between the pawl member 2 and the intermediate member 3 (the axial inertia moment of the pawl member 2 is smaller than that of the intermediate member 3). The difference may be controlled by the friction generated in their axes so that pawl member can be slidably supported with respect to the intermediate member.

While specific embodiments of the invention have been shown and described in detail to illustrate the application of the inventive principles, it will be understood that the invention may be embodied otherwise without departing from such principles.

What I claim:

1. A one-way clutch including:
   (a) an input member which is connected to means for generating a drive force and which can be shifted to a first direction and to a second direction depending on a transmitting direction of said driving force;
   (b) an intermediate member which can have its relative position shifted in relation to the shifting of said input member, and is at the same time shifted in a first direction together with said input member when the input member is shifted in the first direction;
   (c) a transmitting member which changes its posture, when said input member is shifted in the first direction, according to said shifting of the relative position of the intermediate member;
   (d) an output member which engages with said transmitting member, when said input member is shifted in the first direction, by a change in the posture of said transmitting member, and is shifted in the first direction together with said input member, thus transmitting the drive force to a follower side; and
   (e) supporting means for supporting said output member and said intermediate member separately so that said output member will not directly operate on said intermediate member, said supporting means supporting said output member and said intermediate member in such a way that they can be shifted respectively in the first direction and in the second direction.

2. A one-way clutch according to claim 1, wherein said transmitting member is supported rotatably at a concentric position from the center of rotation of said intermediate member.

3. A one-way clutch according to claim 1, wherein two of said transmitting members are provided on said intermediate member.

4. A one-way clutch according to claim 1, wherein said output member is formed in a cylindrical shape and its inner peripheral surface is formed to be engageable with said transmitting member.

* * * * *